United States Patent
Schuit

(10) Patent No.: US 12,424,971 B1
(45) Date of Patent: Sep. 23, 2025

(54) SOLAR PANEL CONTINUITY BONDING DEVICE

(71) Applicant: Unirac Inc., Albuquerque, NM (US)

(72) Inventor: Nathan Schuit, Moriarty, NM (US)

(73) Assignee: Unirac, Inc., Albuquerque, NM (US)

(*) Notice: Subject to any disclaimer, the term of this patent is extended or adjusted under 35 U.S.C. 154(b) by 0 days.

(21) Appl. No.: 18/642,350

(22) Filed: Apr. 22, 2024

Related U.S. Application Data

(63) Continuation of application No. 16/858,246, filed on Apr. 24, 2020, now Pat. No. 11,967,924.

(60) Provisional application No. 62/841,629, filed on May 1, 2019.

(51) Int. Cl.
   *H02S 40/34* (2014.01)
   *H02S 20/23* (2014.01)
   *H02S 30/10* (2014.01)

(52) U.S. Cl.
   CPC ............ *H02S 40/34* (2014.12); *H02S 20/23* (2014.12); *H02S 30/10* (2014.12)

(58) Field of Classification Search
   None
   See application file for complete search history.

(56) References Cited

U.S. PATENT DOCUMENTS

| | | | |
|---|---|---|---|
| 7,866,099 B2 | 1/2011 | Komamine et al. | |
| 8,938,932 B1 | 1/2015 | Wentworth et al. | |
| 9,825,581 B2 | 11/2017 | Wildes | |
| 2012/0073220 A1 | 3/2012 | Kobayashi et al. | |
| 2018/0062561 A1* | 3/2018 | Kapla | F24S 40/44 |
| 2020/0350857 A1 | 11/2020 | Schuit | |

OTHER PUBLICATIONS

Office Action for U.S. Appl. No. 16/858,246, mailed on Jun. 1, 2023, Nathan Schuit, "Solar Panel Continuity Bonding Device", 24 pages.
Office Action for U.S. Appl. No. 16/858,246, mailed on Nov. 23, 2022, Schuit, "Solar Panel Continuity Bonding Device", 21 Pages.

* cited by examiner

*Primary Examiner* — Dustin Q Dam
(74) *Attorney, Agent, or Firm* — Lee & Hayes, P.C.

(57) ABSTRACT

A solar panel system includes a rail including a horizontal flange, a rib, and a channel. A clamp assembly includes a first member having a first side having a groove for receiving a portion of the rib and an anchor member for inserting into the channel. The clamp assembly further includes a second member slideably disposed on a second side of the first member and an actuator. When the actuator is actuated, the second member moves in a direction towards a bottom surface of a solar panel such that a top portion of the second member comes into contact with a bottom portion of the solar panel and electrically bonds with the solar panel, and an anchor member of the actuator comes into contact with an inside surface of the channel and electrically bonds with the rail.

20 Claims, 10 Drawing Sheets

SOLAR PANEL CONTINUITY BONDING DEVICE

RELATED APPLICATION

This application is a continuation of and claims the benefit of priority from U.S. application Ser. No. 16/858,246, filed Apr. 24, 2020, entitled "Solar Panel Continuity Bonding Device," which is now patented as U.S. Pat. No. 11,967,924, and which claims priority from U.S. Provisional Application No. 62/841,629, filed May 1, 2019, entitled "Solar Panel Continuity Bonding Device," each of which is incorporated herein by reference.

BACKGROUND

The industry for racks to mount solar panels (e.g., modules) on roofs is very competitive. However, because sizes of the solar panels have not been standardized, the sizes of the solar panels vary depending on the manufacturer. For example, the thickness (e.g., height) of a solar panel may vary depending on the manufacturer. As such, the racks for mounting the solar panels are relatively customized according to the size of the solar panel produced by the particular manufacturer. Moreover, in order to comply with codes (e.g., National Electric Code NEC)), the racks may need to be bonded and/or grounded. However, because the thickness of the solar panels may vary depending on the manufacture, bonding and/or grounding the solar panels to the racks may be relatively difficult and/or labor intensive. Accordingly, there remains a need for solar panel racks that are more adjustable and more easily bonded and/or grounded.

SUMMARY

Solar panel mounting systems that have the ability to electrically bond to a variety of solar panels that vary in the thickness (e.g., height) are described herein. More specifically, this disclosure relates to solar panel mounting systems that include a clamp assembly (e.g., a bonding clamp) that attaches to a rail (e.g., a trim rail) and electrically bonds with any one of a plurality of solar panels (e.g., modules) having a different thickness (e.g., different height). This summary is provided to introduce simplified concepts of solar panel mounting systems, which are further described below in the Detailed Description. This summary is not intended to identify essential features of the claimed subject matter, nor is it intended for use in determining the scope of the claimed subject matter.

In an embodiment, a solar panel mounting system includes a rail and a clamp assembly for electrically bonding a solar panel (e.g., module) to the rail. The rail may include a horizontal flange protruding from an upper surface of the rail along a longitudinal length of the rail. The rail may include a rib protruding from a lower surface disposed a distance below the horizontal flange. The rib may extend along the longitudinal length. A channel may extend along the longitudinal length adjacent to the rib. The clamp assembly may include a first member and a second member slideably disposed on a side of the first member. An actuator may be disposed with the first member and the second member. When the actuator is actuated, the second member may move in a direction toward a bottom surface of the solar panel such that a top portion of the second member electrically bonds with the solar panel. Moreover, when the actuator is actuated, an anchor member of the actuator may come into contact with an inside surface of the channel of the rail and electrically bond with the rail. The end of the solar panel may be disposed between the horizontal flange and the top portion of the second member. The actuator may move the second member in the direction toward a bottom surface of any one of a plurality of solar panels having a different thickness (e.g., different height). For example, the actuator may move the second member in the direction toward a bottom surface of a first solar panel having a first thickness (e.g., a thickness of about 40 millimeters (mm)) thicker than a second solar panel having a second smaller thickness (e.g., a thickness of about 32 millimeters (mm)) to electrically bond the first solar panel to the rail. In another example, the actuator may move the second member in the direction toward a bottom surface of the second solar panel having the second smaller thickness to electrically bond the second solar panel to the rail.

In an embodiment, a solar panel mounting system includes a clamp assembly for electrically bonding a solar panel to a rail. The clamp assembly may include a first member having a first side opposite a second side. The first side of the first member may include a groove for receiving a portion of a rib of a rail. The first side of the first member may include an anchor member for inserting into a channel of the rail. The clamp assembly may include a second member slideably disposed on the second side of the first member. The clamp assembly may include an actuator. The actuator may be disposed with the first member and the second member. The actuator may include an anchor member for inserting into the channel of the rail. When the actuator is actuated, the second member may move in a direction towards a bottom surface of the solar panel such that a top portion of the second member comes into contact with the bottom portion of the solar panel and electrically bonds with the solar panel. Moreover, when the actuator is actuated, the anchor member of the actuator may come into contact with an inside surface of the channel of the rail and electrically bond with the rail. The actuator may move the second member in the direction toward a bottom surface of a first solar panel having a first thickness thicker than a second solar panel having a second smaller thickness to electrically bond the first solar panel to the rail, or the actuator may move the second member in the direction toward a bottom surface of a second solar panel having the second smaller thickness to electrically bond the second solar panel to the rail.

In an embodiment, a solar panel mounting system includes a rail. The rail may attach to a bracket used to connect the mounting system to a roof. The rail may include a horizontal flange protruding from an upper surface of the rail along a longitudinal length of the rail. The horizontal flange may interface with at least a portion of an end of a solar panel. The rail may include a rib protruding from a lower surface disposed a distance below the horizontal flange. The rib may extend along the longitudinal length. The rib may interface with a groove disposed in a first side of a first member. The rail may include a channel extending along the longitudinal length adjacent to the rib. The channel may receive at least a portion of an anchor member disposed on the first side of the first member for securing a clamp assembly to the rail. The channel may receive an anchor member of an actuator for securing the clamp assembly to the rail and to electrically bond the anchor member of the actuator to the rail.

Depending on the desired esthetic and mechanical properties of the solar panel mounting system, and a structure (e.g., a house, a building, a tower, a container, etc.) the solar panel mounting system is intended to mount thereto, components of the solar panel mounting system may be formed of materials including metal (e.g., aluminum, steel, etc.), plastic, and/or ceramic.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to solar panel mounting systems including a clamp assembly (e.g., a bonding clamp) that attaches to a rail (e.g., a trim rail) and electrically bonds with any one of a plurality of solar panels (e.g., modules) having a different thickness (e.g., different height). Because the clamp assembly of the solar panel mounting system is configured to accommodate a thickness of a solar panel and electrically bond the solar panel to a rail, a user may quickly and easily electrically bond solar panels having varying thicknesses to rails on a roof as desired. Moreover, because the solar panel mounting system includes the clamp assembly that quickly and easily accommodates a thickness of a solar panel and electrically bonds to the rail, a higher modularity of solar panel mounting system is achieved as compared to solar panel mounting systems built for a specific solar panel having a specific thickness.

In an embodiment, a solar panel mounting system includes a rail that has a longitudinal length and is attachable to a bracket, which may be attached to a roof. The rail may include a channel extending along the longitudinal length adjacent to a rib disposed a distance below a horizontal flange protruding from an upper surface of the rail along the longitudinal length. The rib and/or the channel may quickly and easily attach to a first member of a clamp assembly that electrically bonds with any one of a plurality of solar panels having a different thickness.

As used herein, the term "electrical bond," "electrically bonding," "bonding," or "grounding," includes any act of joining electrical conductors together. For example, the term "electrical bond," "electrically bonding," "bonding," or "grounding," includes the practice of intentionally electrically connecting metallic items together. The electrical bonding may be conducted in accordance with the National Electric Code (NEC).

Illustrative Solar Panel Mounting Systems

Figure 1:
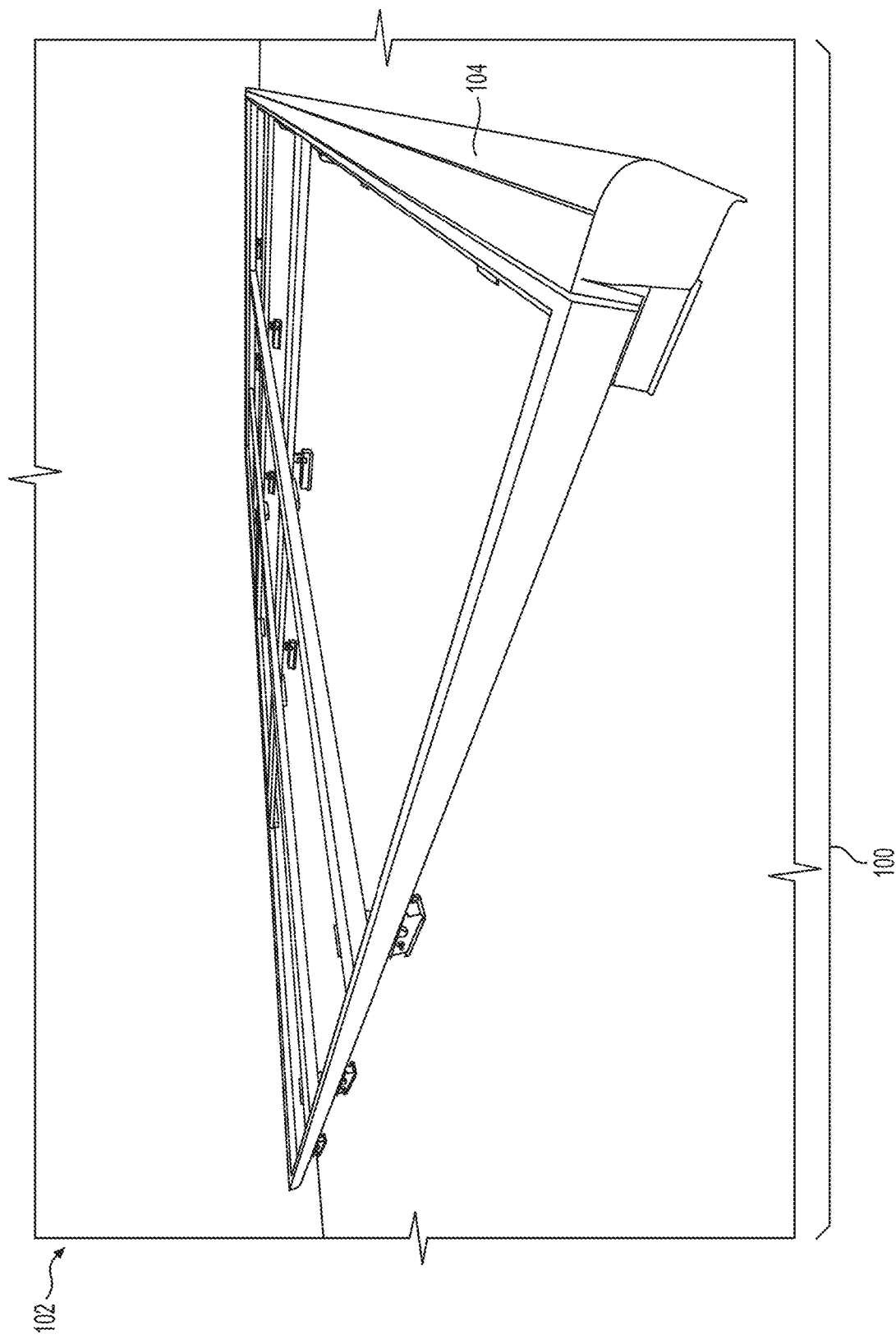
FIG. 1 illustrates a top perspective view of an exemplary solar panel mounting system including a rail for attaching to a bracket, shown attached to a roof.

FIG. 1 illustrates a top perspective view 100 of an embodiment solar panel mounting system 102 including a rail 104. The system may be attached to a bracket attached to a roof. The rail 104 may be an extrusion. For example, the rail 104 may be a metal extrusion, such as an aluminum extrusion.

The solar panel mounting system 102 may mount solar panels (e.g., modules) (not shown) to a roof or other surfaces, structures, machines, etc. For example, the solar panel mounting systems may be used to mount solar panels to walls, to the ground, to poles, to bridges, to vehicles, etc. The sizes of the solar panels may vary. That is, the various distinct manufacturers of solar panels have not standardized the sizes of the solar panels available in the industry, and thus the size of each panel may vary based on the manufacturer producing the panel. For example, one manufacturer may produce a solar panel having a thickness (e.g., height) of about 32 millimeters (mm), while another manufacturer may produce another different solar panel having a thickness of about 40 mm. As such, the solar panel mounting system 102 may include a clamp assembly that attaches to the rail 104 and electrically bonds with any one of the solar panels having a different thickness. For example, the clamp assembly may attach to the rail 104 and electrically bond to a solar panel having a thickness of about 32 mm. In another example, the clamp assembly may attach to the rail 104 and electrically bond to another different solar panel having a thickness of about 40 mm. Different solar panels may have different respective thicknesses depending on a solar cell efficiency of the solar panels. For example, a solar panel having a thickness of about 32 mm may have a lower solar cell efficiency than a solar panel having a thickness of about 40 mm. Regardless, a solar panel mounting system as described herein facilitates a user (e.g., an installer, a technician, etc.) to quickly and easily install solar panels having varying thicknesses on surfaces such as the ground or a roof, structures, machines, etc. as desired. The clamp assembly 202 may provide for fitting solar panels having a size of at least about 32 mm to about 40 mm. Although, the range of thicknesses as aforementioned is not to be understood as a limit on the capability of the instant disclosure to accommodate sizes outside of that range.

Figure 2:
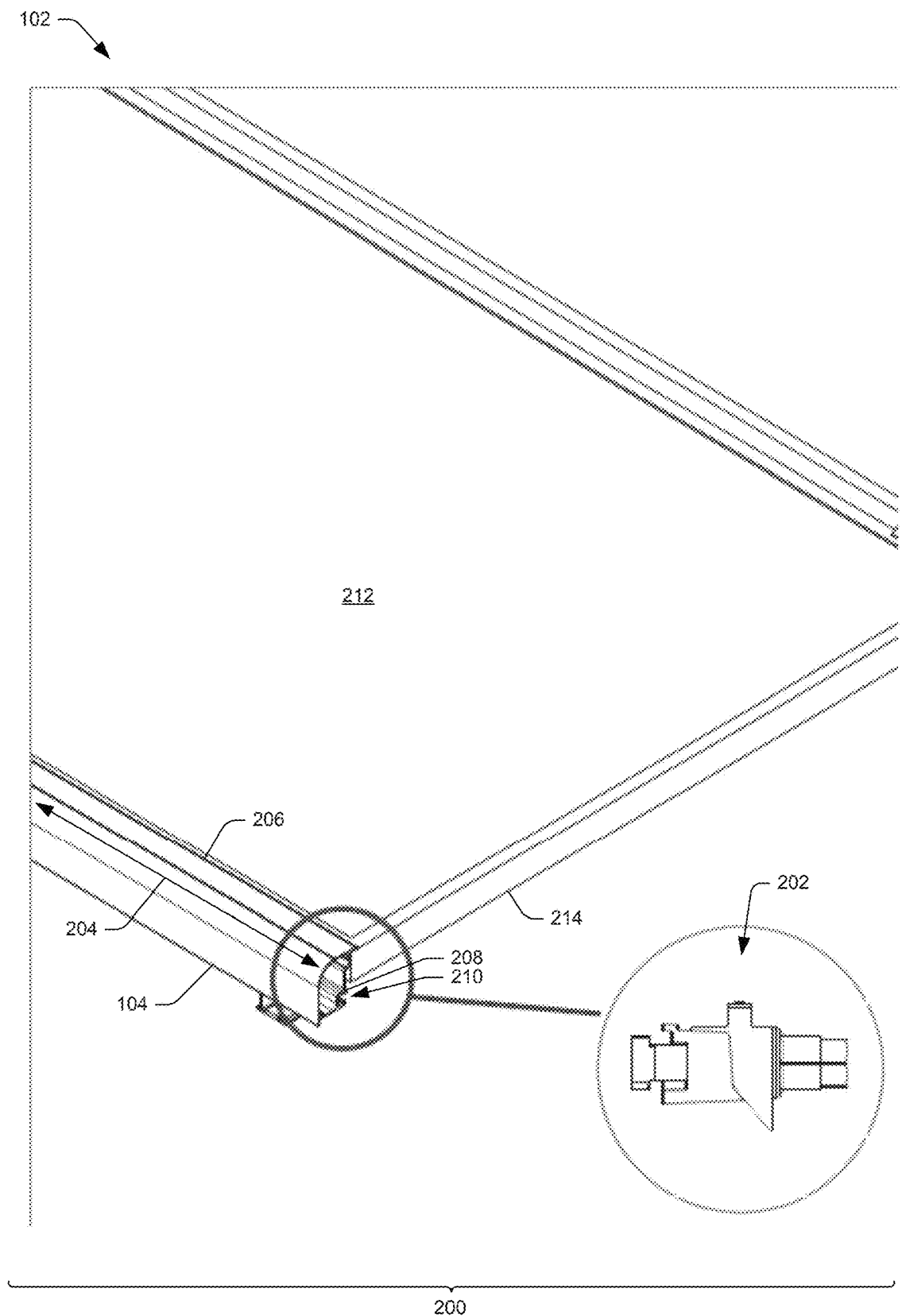
FIG. 2 illustrates a front perspective view of a clamp assembly attached to a rail of the solar panel mounting system of FIG. 1 according to an embodiment in this disclosure.

FIG. 2 illustrates a front perspective view 200 of a clamp assembly 202 attached to the rail 104 of the solar panel mounting system 102 of FIG. 1, according to an embodiment in this disclosure. FIG. 2 illustrates the rail 104 may have a longitudinal length 204. A horizontal flange 206 may protrude from an upper surface of the rail 104 along the longitudinal length 204. A rib 208 may protrude from a lower surface disposed a distance below the horizontal flange 206 and may extend along the longitudinal length 204. A channel 210 may extend along the longitudinal length 204 adjacent to the rib 208. A solar panel 212 may be installed in the rail 104. The solar panel 212 may include a flange 214 (e.g., a module flange) disposed on ends of the solar panel 212. The flange 214 may be formed of metal such as aluminum, for example. The metal may be anodized, galvanized, painted, etc. The clamp assembly 202 may electrically bond the solar panel 212 to the rail 104. While FIG. 2 illustrates the clamp assembly 202 may electrically bond the solar panel 212 to the rail 104, the clamp assembly 202 may further provide for attaching the rail 104 to a solar panel. For example, the clamp assembly 202 may provide for attaching the rail 104 to a solar panel when fewer than two rafter attachment points are available.

Figure 3:
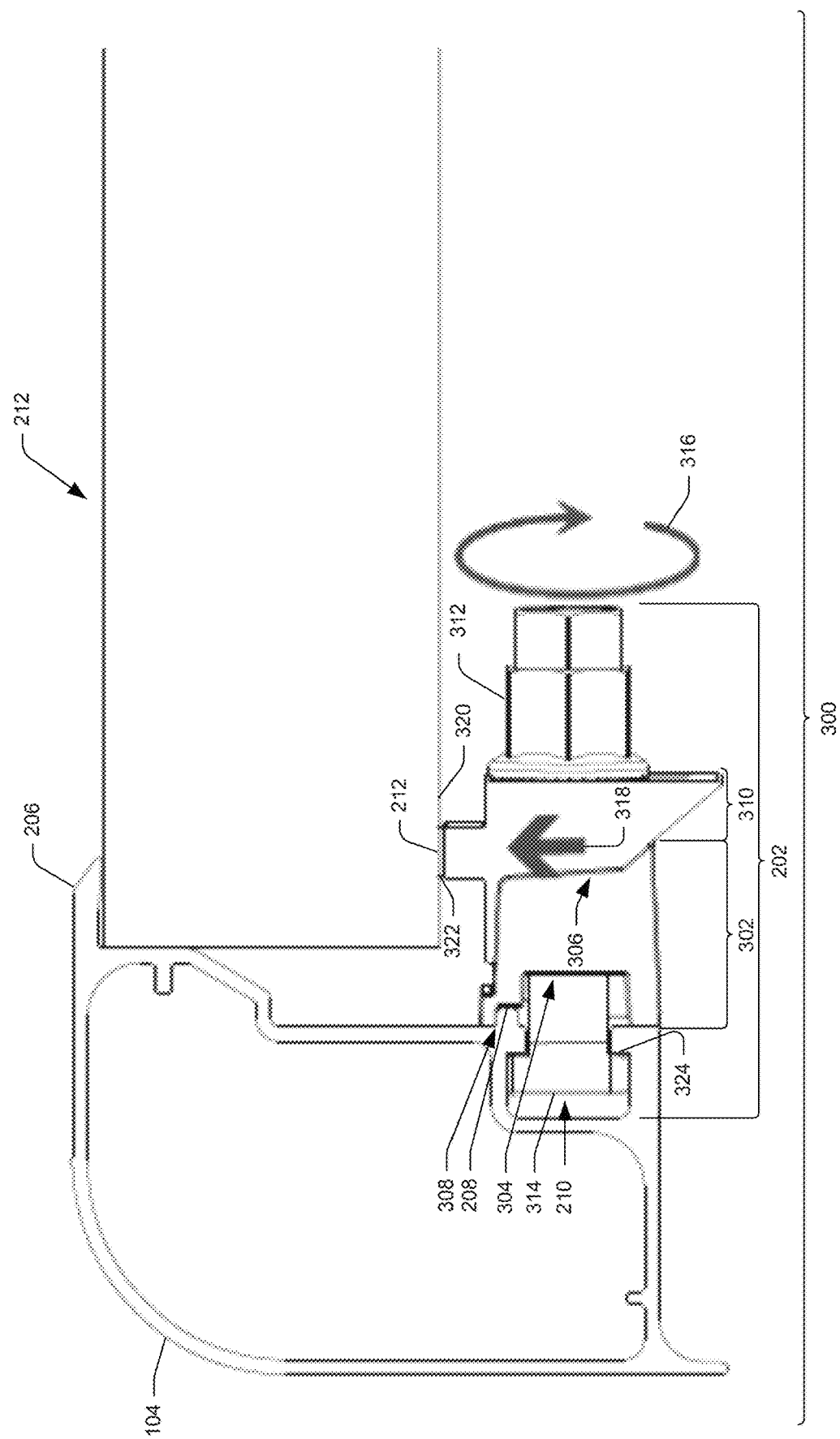
FIG. 3 illustrates a side view of the clamp assembly attached to the rail of the solar panel mounting system of FIG. 1 according to an embodiment in this disclosure.

FIG. 3 illustrates a side perspective view 300 of the clamp assembly 202 attached to the rail 104 of the solar panel mounting system 102 of FIG. 1 according to an embodiment in this disclosure. The clamp assembly 202 may have a first member 302 having a first side 304 opposite a second side 306. The first side 304 of the first member 302 may have a groove 308 for receiving a portion of the rib 208 and an anchor member (not shown) (described in detail below with regard to FIG. 8) for inserting into the channel 210. A second member 310 may be slideably disposed on the second side 306 of the first member 302. The second member 310 may be electrically bonded with the second side 306 of the first member 302. The second member 310 may be slideably disposed on the second side 306 of the first member 302 to electrically bond any one of a plurality of solar panels each solar panel having a different thickness to the rail 104. For example, the second member 310 may be slideably disposed on the second side 306 of the first member 302 to electrically bond to a solar panel having a thickness of about 32 mm. In another example, the second member 310 may be slideably disposed on the second side 306 of the first member 302 to electrically bond to another different solar panel having a thickness of about 40 mm.

An actuator 312 may be disposed with the first member 302 and the second member 310. For example, the actuator 312 may pass through an opening in the first member 302 and pass through an opening in the second member 310. The actuator 312 may include an anchor member 314 for inserting into the channel 210. The actuator 312 may be a T-bolt threadably coupled to a nut (e.g., a tri-drive nut).

When the actuator 312 is actuated 316, the second member 310 may move in a direction 318 towards a bottom surface 320 of the solar panel 212. The second member 310 may move in the direction 318 such that a top portion 322 of the second member 310 comes into contact with the bottom surface 320 of the solar panel 212 and electrically bonds with the solar panel 212. The top portion 322 of the second member 310 may include a pin (e.g., bonding pin) disposed in the top portion 322 of the second member 310. The top portion 322 of the second member 310 may include one or more protrusions (e.g., serrations, teeth, etc.) for puncturing or compromising an anodized layer, a galvanized layer, a painted layer, etc. of the flange 214 to electrically bond with the rail 104. For example, the pin disposed in the top portion 322 of the second member 310 may include one or more protrusions (e.g., serrations, teeth, etc.) for puncturing or compromising an anodized layer, a galvanized layer, a painted layer, etc. of the flange 214 to electrically bond with the solar panel 212.

When the actuator 312 is actuated 316, the anchor member 314 of the actuator 312 may come into contact with an inside surface 324 of the channel 210. The anchor member 314 of the actuator may come into contact with the inside surface 324 of the channel and electrically bond with the rail 104. The anchor member 314 may include one or more protrusions (e.g., serrations, teeth, etc.) for puncturing or compromising an anodized layer, galvanized layer, a painted layer, etc. of the rail 104 to electrically bond with the rail 104. A torque of about 20 ft. lbs. may be applied to the actuator 312 subsequent to the top portion 322 of the second member 310 coming into contact with the bottom surface 320 of the solar panel 212.

With the second member 310 electrically bonded to the solar panel 212, the first member 302 electrically bonded to the second member 310, and the anchor member 314 electrically bonded to the rail 104 and to the first member 302 and/or to the second member 310, the solar panel 212 may be electrically bonded to the rail 104.

Figure 4:
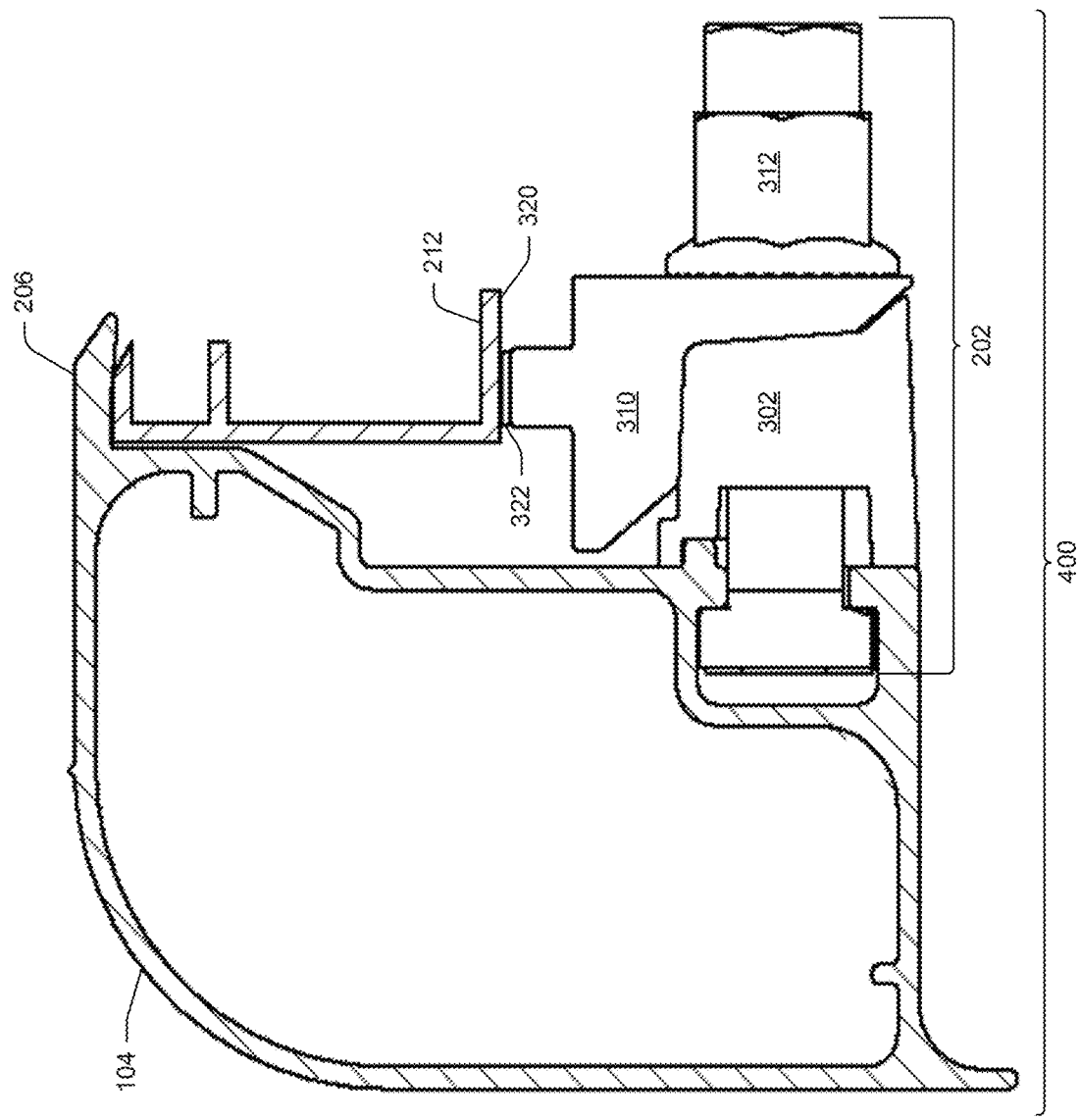
FIG. 4 illustrates a side section view of the rail and a flange (e.g., module flange) with the clamp assembly attached to the rail of the solar panel mounting system of FIG. 1 according to an embodiment in this disclosure.

FIG. 4 illustrates a side section view 400 of the rail 104 and the flange 214 with the clamp assembly 202 attached to the rail 104 of the solar panel mounting system 102 of FIG. 1 according to an embodiment in this disclosure. FIG. 4 illustrates the top portion 322 of the second member 310 may come into contact with the bottom surface 320 of the solar panel 212 and electrically bond with the solar panel 212. For example, the top portion 322 of the second member 310 may come into contact with the bottom surface 320 of the flange 214 of the solar panel 212. For example, a pin disposed in the top portion 322 of the second member 310 may include one or more protrusions (e.g., serrations, teeth, etc.) for puncturing or compromising an anodized layer, a galvanized layer, a painted layer, etc. of the flange 214 to electrically bond with the solar panel 212.

Figure 5:
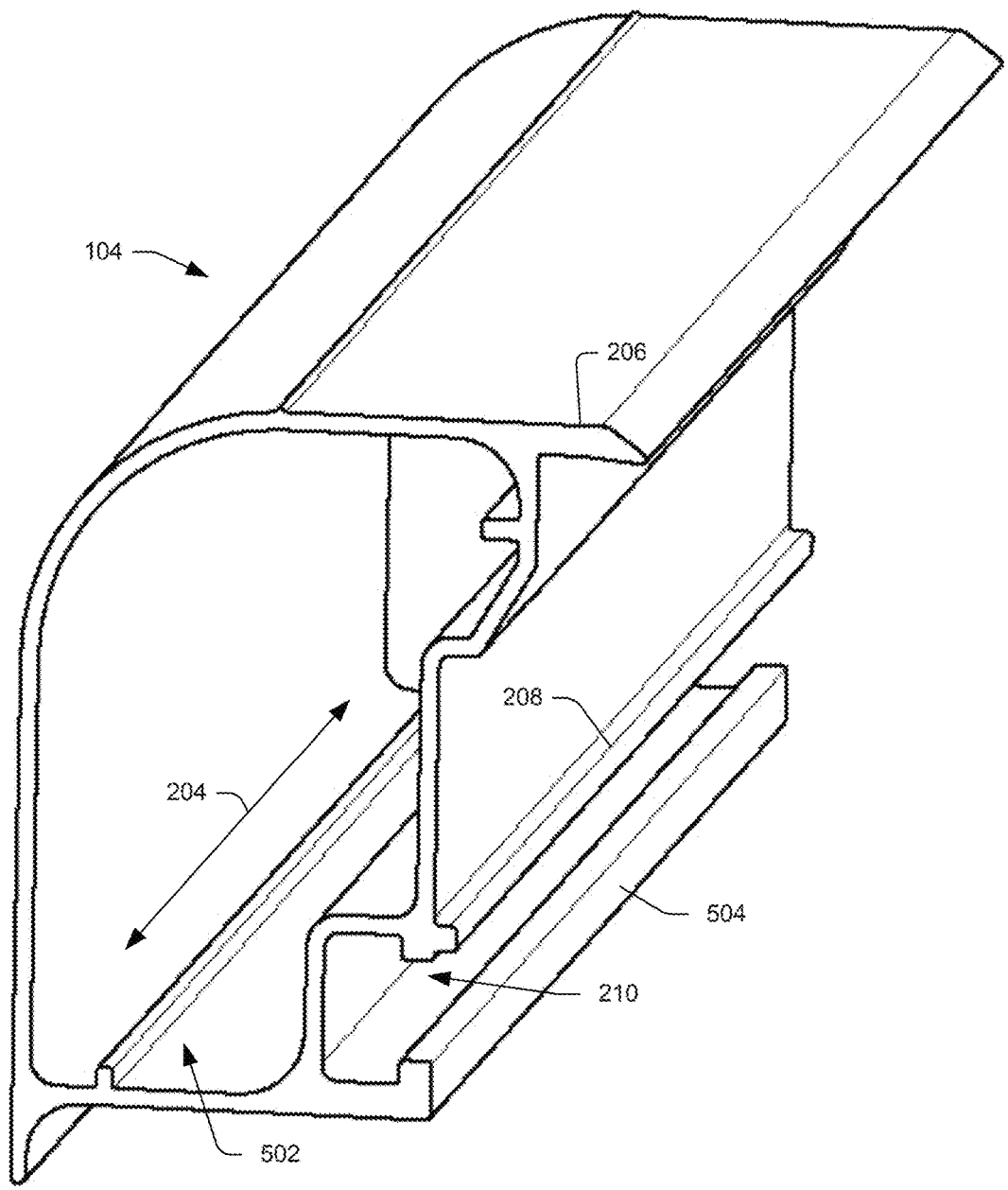
FIG. 5 illustrates a front perspective view of the rail of the solar panel mounting system of FIG. 1 according to an embodiment in this disclosure.

FIG. 5 illustrates a front perspective view 500 of the rail 104 of the solar panel mounting system 102 of FIG. 1, according to an embodiment in this disclosure. The rail 104 may include a cavity 502 disposed behind the horizontal flange 206, the rib 208, and the channel 210. Cavity 502 may extend along the longitudinal length 204. The cavity 502 may provide for receiving a splice bar (not shown). The rail 104 may have a length of about 65 inches, a height of about 3 inches, and a width of about 2.5 inches. The rail 104 may include a surface 504 disposed below the rib 208 and extending the longitudinal length 204. When the clamp assembly 202 is attached to the rail 104 the clamp assembly 202 may interface with the surface 504 of the rail 104.

Figure 6:
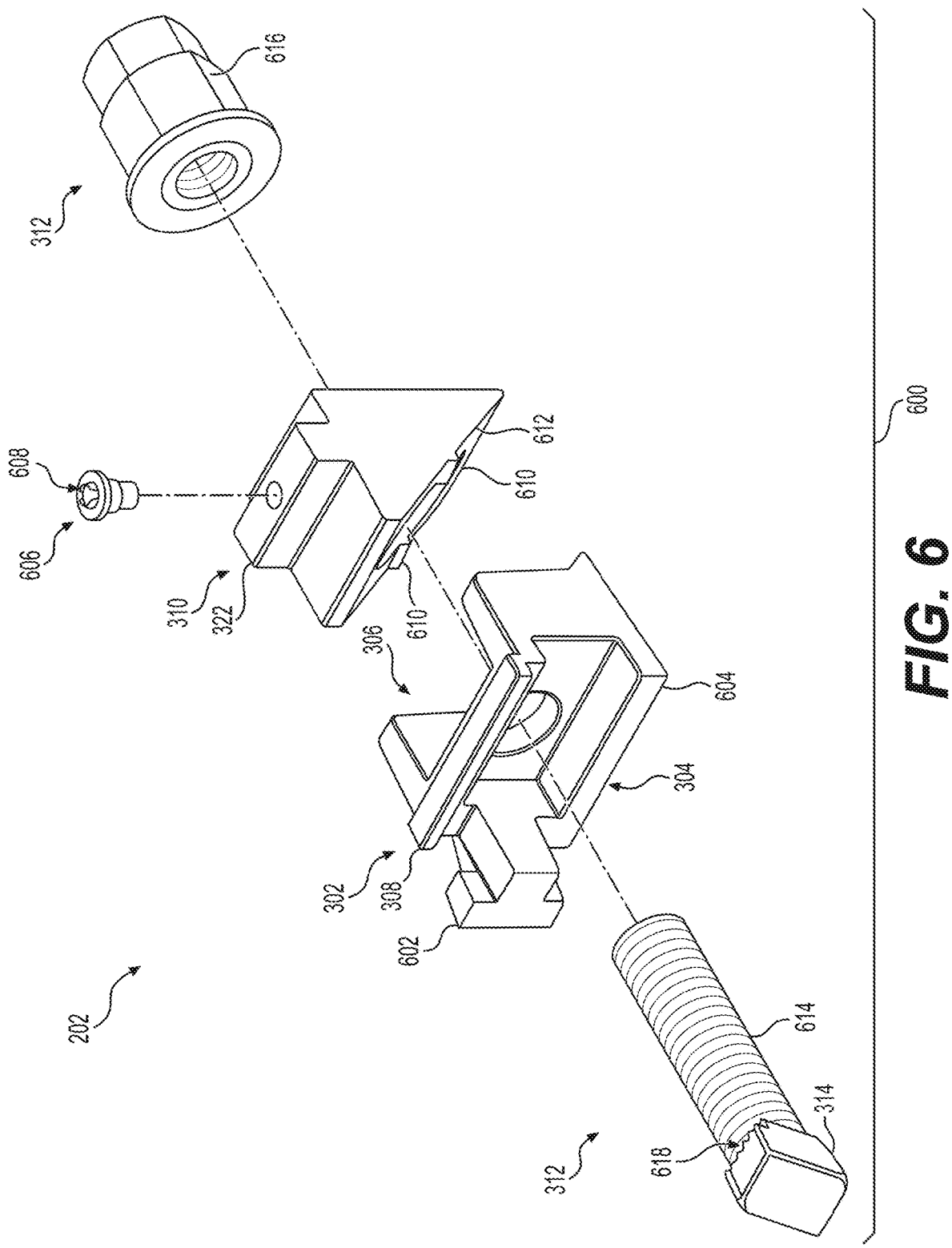
FIG. 6 illustrates a perspective exploded view of the clamp assembly according to an embodiment in this disclosure.

FIG. 6 illustrates a perspective exploded view 600 of the clamp assembly 202 according to an embodiment in this disclosure. As discussed above, the first member 302 may have the first side 304 opposite the second side 306. An anchor member 602 may insert into the channel 210 of the rail 104. The anchor member 602 may be a T-shaped protrusion for inserting into the channel 210. The anchor member 602 may prevent the clamp assembly 202 from rotating relative to the actuator 312 anchored to the channel 210. The anchor member 602 and the first member 302 may be integral and formed of a single unit of material (e.g., metal, plastic, composite, etc.). The anchor member 602 may be disposed below the groove 308 on the first side 304. The first member 302 may include a surface 604 disposed below the anchor member 602. When the clamp assembly 202 is attached to the rail 104, the surface 604 of the clamp assembly 202 may interface with the surface 504 of the rail 104.

A pin 606 may be disposed in the top portion 322 of the second member 310. The pin 606 may include one or more protrusions 608 (e.g., serrations, teeth, etc.) for puncturing or compromising an anodized layer, a galvanized layer, a painted layer, etc. of the flange 214 to electrically bond with the solar panel 212. The second member 310 may include one or more protrusions 610 disposed on a sloped surface 612 of the second member 310. The one or more protrusions 610 may provide for limiting the displacement of the second member 310. The sloped surface 612 may provide for the second member 310 to move in the direction 318 towards the bottom surface 320 of the solar panel 212. The sloped surface 612 may provide for the second member 310 to move in a direction toward the first member 302. For example, the sloped surface 612 may provide for the second member 310 to move in a second direction perpendicular to the direction 318. The sloped surface 612 may have a slope of about 1 degree to about 89 degrees. The second side 306 of the first member 302 may have a slope similar to the slope of the sloped surface 612 of the second member 310.

The actuator 312 may be a T-bolt 614. The T-bolt 614 may threadably couplable to a nut 616. The anchor member 314 may be a T-shaped head of the T-bolt 614 for inserting into the channel 210 (e.g., a tri-drive nut). The anchor member 314 may include one or more protrusions 618 (e.g., serrations, teeth, etc.) for puncturing or compromising an anodized layer, galvanized layer, a painted layer, etc. of the inside surface 324 of the rail 104 to electrically bond with the rail 104.

Figure 7:
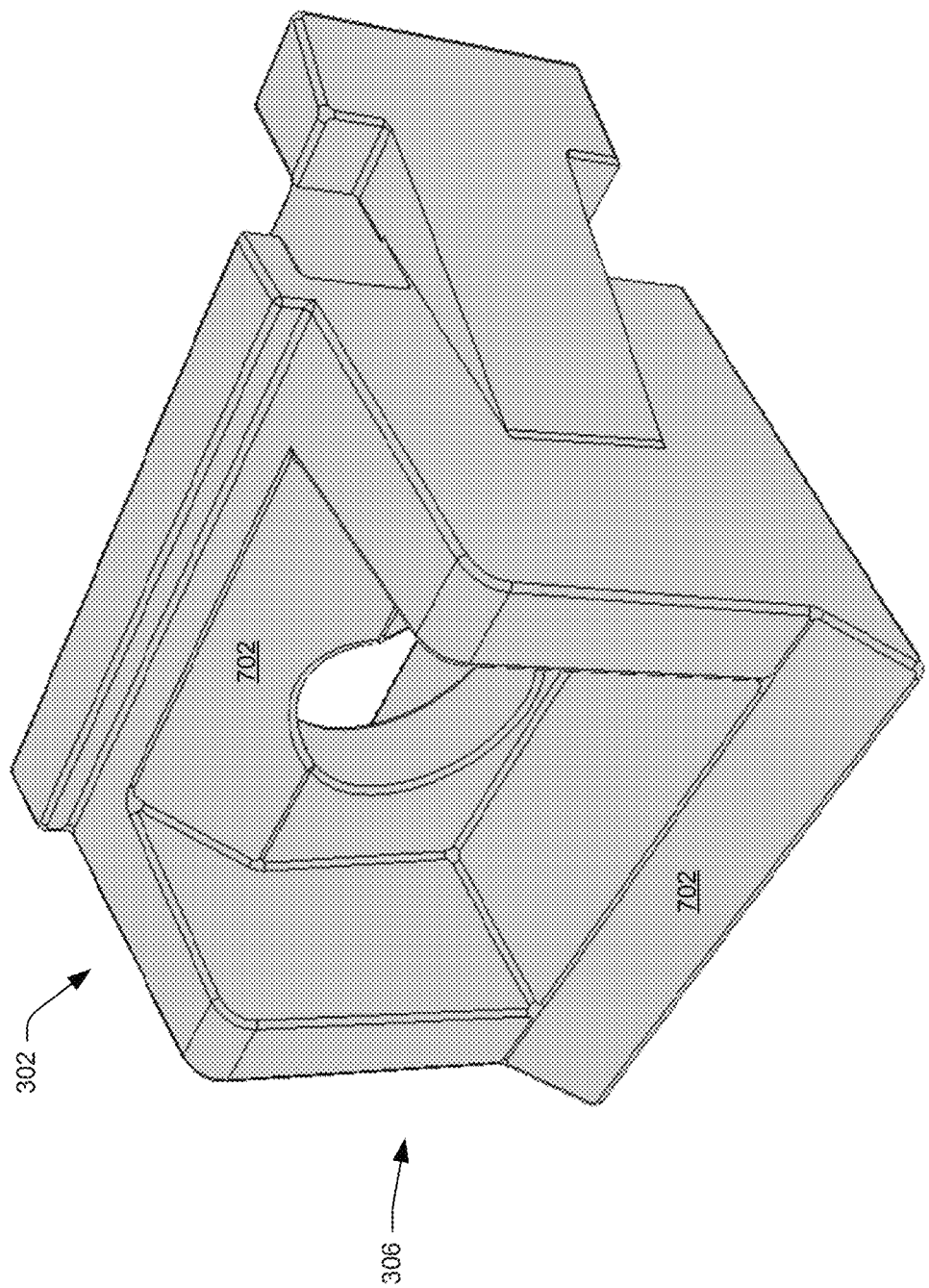
FIG. 7 illustrates a perspective view of a first member of the clamp assembly of the solar panel mounting system of FIG. 1 according to an embodiment in this disclosure.

FIG. 7 illustrates a perspective view 700 of the first member 302 of the clamp assembly 202 of the solar panel mounting system 102 of FIG. 1 according to an embodiment in this disclosure. The second side 306 of the first member 302 may include one or more sloped surfaces 702. The one or more sloped surfaces 702 may interface with the sloped surface 612 of the second member 310.

Figure 8:
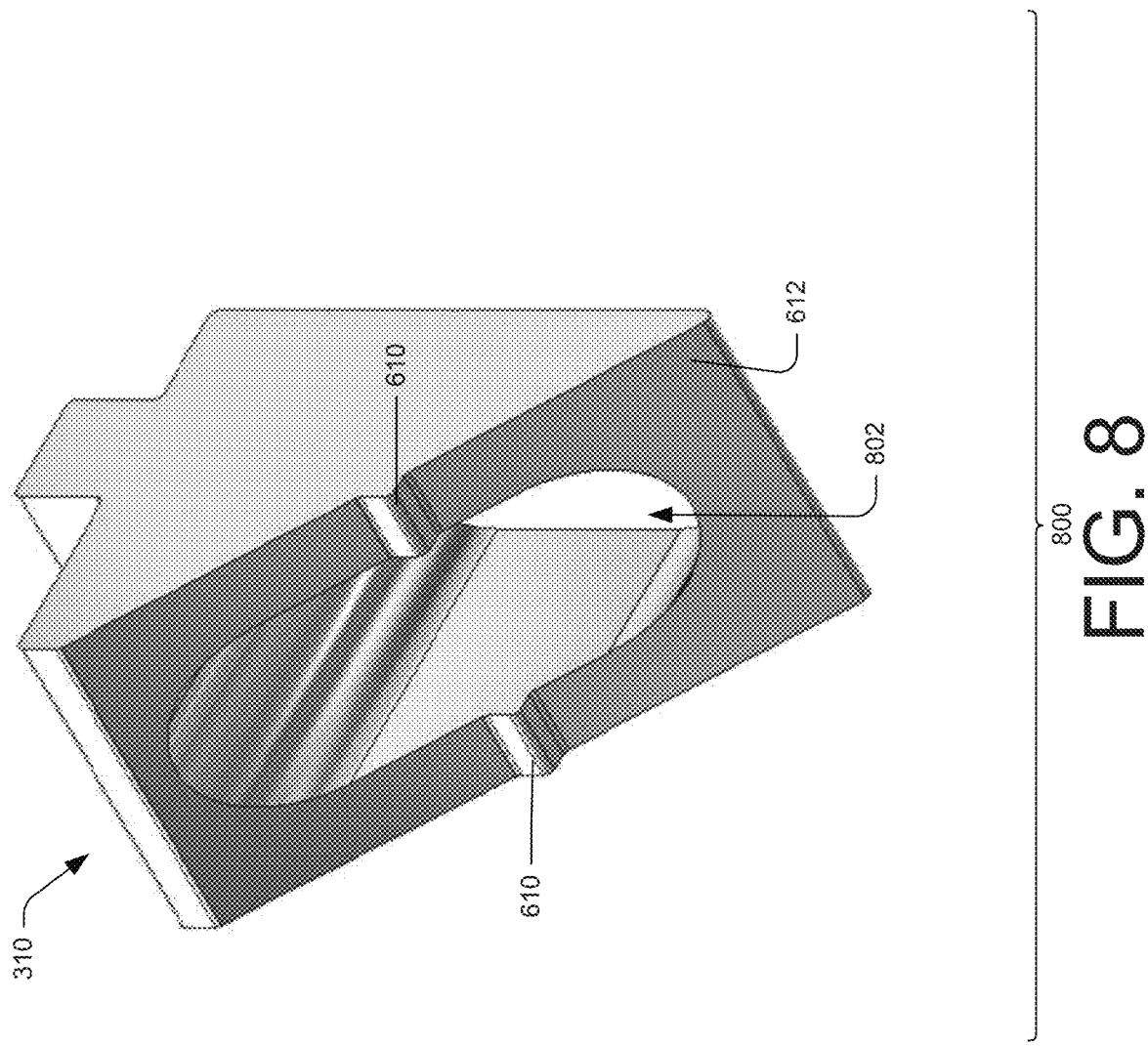
FIG. 8 illustrates a perspective view of a second member of the clamp assembly of the solar panel mounting system of FIG. 1 according to an embodiment in this disclosure.

FIG. 8 illustrates a perspective view 800 of the second member 310 of the clamp assembly 202 of the solar panel mounting system 102 of FIG. 1 according to an embodiment in this disclosure. FIG. 8 illustrates the one or more protrusions 610 disposed on the sloped surface 612 of the second member 310. An opening 802 may be disposed in the second member 310. The opening 802 may be a slot having a size to provide for the second member 310 to move in the direction 318 towards the bottom surface 320 of the solar panel 212. The opening 802 may provide for limiting the displacement of the second member 310.

Figure 9:
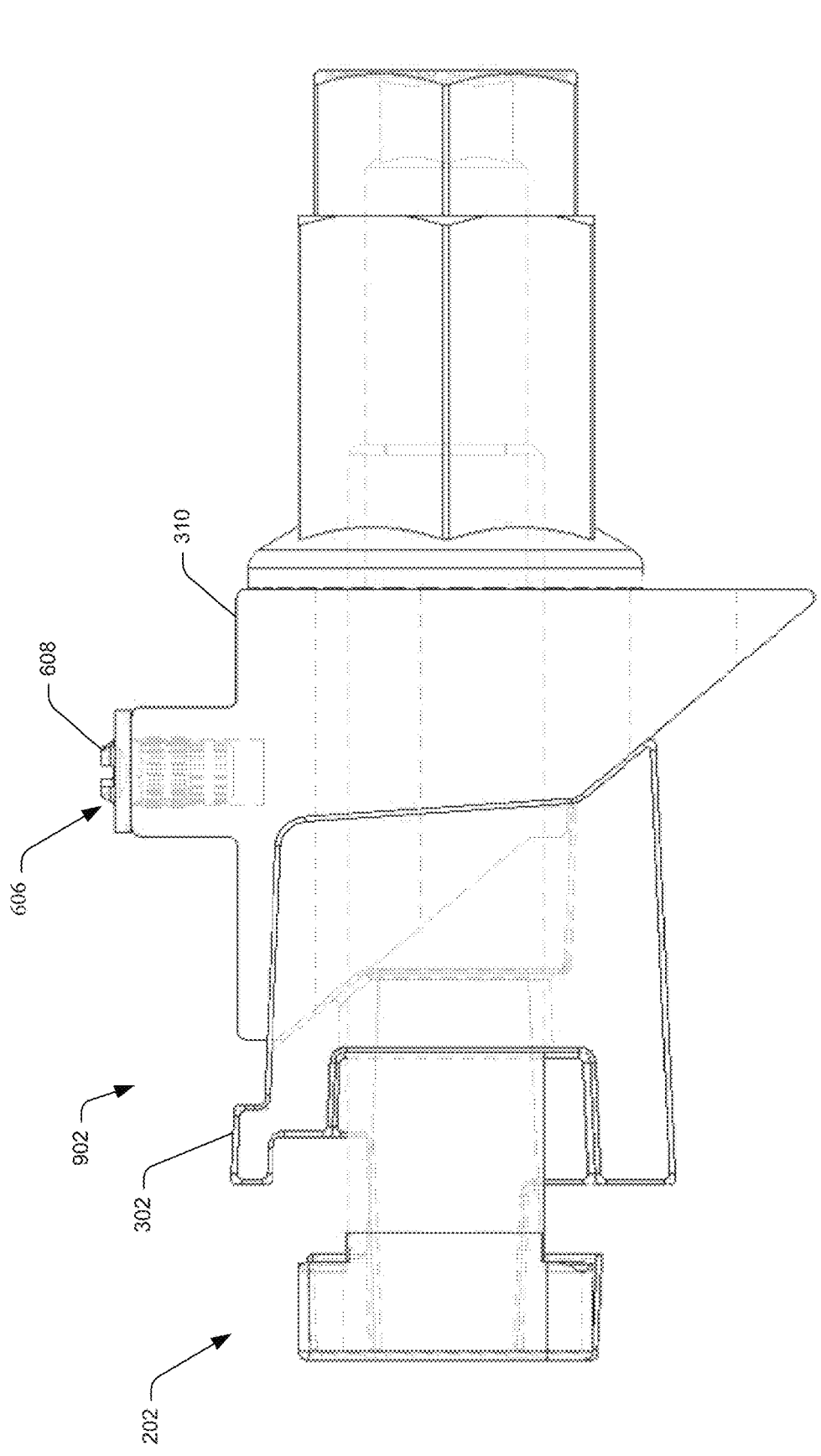
FIG. 9 illustrates a transparent side view of the clamp assembly in a down position according to an embodiment in this disclosure.

FIG. 9 illustrates a transparent side view 900 of the clamp assembly 202 in a down position 902 according to an embodiment in this disclosure. When the clamp assembly 202 is in the down position 902, the second member 310 may be positioned relative to the first member 302 to provide for electrically bonding a solar panel having a thickness of about 40 mm to the rail 104. One or more protrusions 608 may be disposed at the top of the pin 606 for puncturing or compromising an anodized layer, a galvanized layer, a painted layer, etc. of the flange 214 to electrically bond with the solar panel 212.

Figure 10:
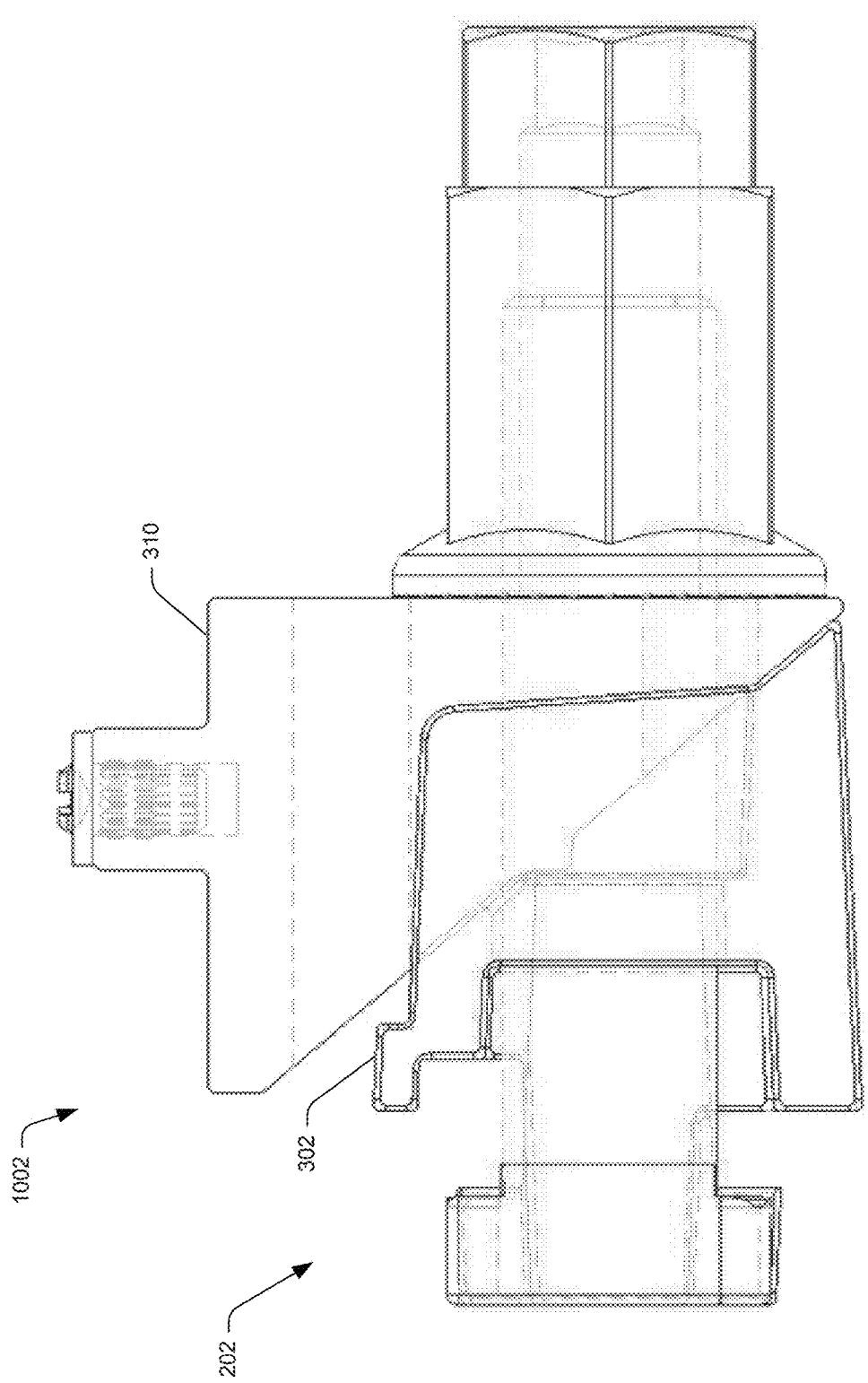
FIG. 10 illustrates a transparent side view of the clamp assembly in an up position according to an embodiment in this disclosure.

FIG. 10 illustrates a transparent side view 1000 of the clamp assembly 202 in an up position 1002 according to an embodiment in this disclosure. When the clamp assembly 202 is in the up position 1002, the second member 310 may be positioned relative to the first member 302 to provide for electrically bonding a solar panel having a thickness of about 32 mm to the rail 104. The second member 310 of the clamp assembly may move in the direction 318 between the down position 902 and the up position 1002 to provide for electrically bonding with a solar panel having a thickness ranging from about 40 mm to about 32 mm.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A clamp assembly for use in a solar panel mounting system, the clamp assembly comprising:
    a clamp member including a body having a through hole with a central axis;
    a first anchor that is integrally formed at a lateral side surface of the clamp member such that the first anchor is distinctly spaced apart from the through hole and protruding from the lateral side of the clamp member, the first anchor protruding adjacent to the central axis of the through hole extends, and the first anchor having a free end with a first shape; and
    a second anchor sized to extend through the through hole in the clamp member, the second anchor having a first end with a second shape that corresponds to the first shape of the first anchor, and a second end that is threaded; wherein the first end of the second anchor is laterally adjacent to the free end of the first anchor.

2. The clamp assembly of claim 1, wherein the clamp member is a first clamp member, and the through hole is a first through hole, and
    wherein the clamp assembly further comprises a second clamp member configured to engage with the first clamp member on a side thereof opposite the first anchor, the second clamp member having a second through hole such that upon engagement between the first clamp member and the second clamp member, the second through hole aligns coaxially with the first through hole.

3. The clamp assembly of claim 2, wherein the second anchor is rotatable about the central axis.

4. The clamp assembly of claim 2, wherein the second anchor is slidably actuatable along the central axis when installed.

5. The clamp assembly of claim 2, wherein the second anchor is a threaded bolt.

6. The clamp assembly of claim 2, wherein the first shape of the first anchor includes oppositely extending protrusions about a central portion integrally formed with the body of the clamp member, whereby the protrusions are sized to slide into a guide channel of a trim rail and anchor the clamp member to the trim rail.

7. The clamp assembly of claim 2, wherein the second shape of the first end of the second anchor is configured to catch within a guide channel of a trim rail in parallel with the first anchor.

8. A clamp assembly for use in a solar panel mounting system, the clamp assembly comprising:
    a clamp member including a body having a through hole with a central axis;
    a first anchor that is integrally formed with the clamp member, the first anchor protruding from a side of the clamp member in a same direction in which the central axis of the through hole extends, and the first anchor having a free end of a T-shape, and the free end protruding from the side of the clamp member so as to be laterally adjacent to the central axis; and a second anchor sized to extend through the through hole in the clamp member, the second anchor having an end with a T-shape that corresponds to the T-shape of the first anchor.

9. The clamp assembly of claim 8, wherein the second anchor includes one or more protrusions for puncturing an anodized layer, a galvanized layer, or a painted layer of a rail upon installation of the clamp assembly.

10. The clamp assembly of claim 8, wherein the second anchor is slidably displaceable within the through hole such the end of the second anchor is adjustable to align laterally with the free end of the first anchor.

11. The clamp assembly of claim 8, wherein the clamp member is a first clamp member, and
wherein the clamp assembly further comprises a second clamp member configured to slidingly engage the first clamp member.

12. The clamp assembly of claim 11, wherein the second clamp member has a through hole positioned to align coaxially with the through hole of the first clamp member upon installation.

13. The clamp assembly of claim 12, further comprising a nut that engages with an opposing end of the second anchor to hold the second anchor in place upon installation of the clamp assembly.

14. The clamp assembly of claim 8, wherein the T-shape of the first anchor and the T-shape of the second anchor are a same size.

15. A clamp assembly comprising:
a first clamp member including a first body having a first through hole, a first central axis of the first through hole extending in a first direction;
a second clamp member including a second body having a second through hole, the second clamp member configured to laterally engage the first clamp member such that a second central axis of the second through hole aligns with the first central axis of the first through hole;
a first anchor that is integrally formed with the first clamp member, the first anchor protruding from a side of the first clamp member in a same direction as the first direction in which the first central axis of the first through hole extends, the first anchor having a free end of a T-shape, and the free end protruding from the side of the first clamp member so as to be laterally adjacent to the first central axis; and
a second anchor sized to extend through the first through hole in the first clamp member and the second through hole in the second clamp member, the second anchor having an end with a T-shape that corresponds in shape and size to the T-shape of the first anchor.

16. The clamp assembly of claim 15, wherein the second clamp member includes one or more protrusions that protrude from a surface above the second through hole, the one or more protrusions for puncturing an anodized layer, a galvanized layer, or a painted layer of a solar panel.

17. The clamp assembly of claim 15, wherein the second anchor include a threaded shaft via which a threaded nut is configured to engage to secure the second anchor in position.

18. The clamp assembly of claim 15, wherein the second anchor is slidable within the first through hole and the second through hole simultaneously whereby the second anchor secures the first clamp member to the second clamp member together.

19. The clamp assembly of claim 15, wherein the first clamp member has a first surface that is angled with respect to a horizontal plane, and
wherein the second clamp member has a second surface that is angled with respect to the horizontal plane in an inverse angle to the first surface, such that upon engagement, the first surface slides planarly against the second surface.

20. The clamp assembly of claim 15, wherein the first anchor and the second anchor are configured to engage a guide channel in a rail in a third direction that is perpendicular to the first direction, and
wherein the second clamp member is configured to support against a solar panel frame upon installation.

* * * * *